United States Patent [19]
Shepherd et al.

[11] Patent Number: 6,112,860
[45] Date of Patent: Sep. 5, 2000

[54] VEHICLE BRAKE STATUS INDICATING APPARATUS

[75] Inventors: Robert W. Shepherd, Pelzer; James D. Wasness, Inman, both of S.C.

[73] Assignee: Ellcon-National, Inc., Greenville, S.C.

[21] Appl. No.: 09/245,628

[22] Filed: Feb. 5, 1999

[51] Int. Cl.[7] .................................................. F16D 66/00
[52] U.S. Cl. .................. 188/1.11 R; 188/1.11 W; 188/1.11 E; 188/197; 303/1; 303/20
[58] Field of Search .................. 188/1.11 W, 1.11 L, 188/1.11 E, 1.11 R, 198–202, 197; 116/208; 92/5 R; 303/20, 1; 701/19, 20

[56] References Cited

U.S. PATENT DOCUMENTS

| | | |
|---|---|---|
| 3,283,861 | 11/1966 | Mersereau . |
| 3,850,269 | 11/1974 | Beacon . |
| 4,312,428 | 1/1982 | Beacon ..................................... 188/198 |
| 4,596,311 | 6/1986 | Brodeur et al. ......................... 188/1.11 |
| 5,335,974 | 8/1994 | Klink . |
| 5,503,467 | 4/1996 | Gaughan . |
| 5,701,974 | 12/1997 | Kanjo et al. ......................... 188/1.11 R |

*Primary Examiner*—Douglas C. Butler
*Attorney, Agent, or Firm*—Norris, McLaughlin & Marcus; L. P. Brooks

[57] ABSTRACT

In a vehicle braking system having a slack adjuster with an actuator and an electrically operable car control unit, an electrical switch is responsive the position of the actuator and is coupled to the car control unit to provide an indication of the condition of the vehicle brake shoes, i.e. whether or not the brake shoes are disengaged from the vehicle wheels.

6 Claims, 2 Drawing Sheets

VEHICLE BRAKE STATUS INDICATING APPARATUS

FIELD OF THE INVENTION

The invention relates to the detection and indication of the condition of the brakes, e.g. whether the brakes are applied or fully released, of a vehicle having a brake slack adjuster.

BACKGROUND OF THE INVENTION

In the railway car field, there is increasing use of a car control unit (CCU) at each car in a train of cars for controlling the braking of cars. The CCU is electrically connected to a Head End Unit (HEU) in the locomotive for control and indicating purposes. See, for example, U.S. Pat. Nos. 5,335,974 and 5,503,467.

Normally, the brakes are applied by an air operated piston and cylinder assembly which is connected to the brakes by a series of levers and beams. Brake rigging ratios to increase braking force, along with the 5/8" allowable wear of eight shoes, will produce major rigging component displacement problems and excessive piston stroke. It is, therefore, necessary to include a brake slack adjuster in the mechanism or "rigging" which interconnects the piston and cylinder assembly with the brake shoes. See, for example, U.S. Pat. Nos. 3,850,269; 4,312,428 and 3,283,861. Normally, the pressure of the air in the piston and cylinder assembly is an indication of whether the brakes are applied or released. However, such air pressure, e.g. when it is relatively low or zero, does not necessarily indicate that the brake shoes have become disengaged from the car wheels because there may be a fault in the brake shoe driving mechanism which, even though the air pressure in the piston and cylinder assembly is low or zero, will not permit the brake shoes to move away from the wheels. In the event of such a fault, the brake shoes and the wheels which they engage will overheat when the car is put in motion. Accordingly, an indication at the Head End Unit (HEU) that the bar brakes have been released, which is based on the air pressure in the piston and cylinder assembly, is not always reliable.

When the brake rigging includes a brake slack adjuster, it is disposed intermediate the brake force generator, i.e. the piston and cylinder assembly, and the brake beams which support and move the brake shoes. The trigger or actuator return spring of a brake slack adjuster usually has a size and strength sufficient to return the levers, etc., of the brake rigging to the full release position provided that there are no extraneous forces which prevent full release. In other words, the position of the actuator or trigger is a direct, rather than an indirect, indication of brake shoe disengagement from the car wheels.

SUMMARY OF THE INVENTION

In accordance with the preferred embodiment of the invention, an electrical switch is mounted so that it is operated by the slack adjuster actuator or trigger, and therefore, the electrical condition of the switch indicates whether or not the brake shoes have become disengaged from the associated wheels. The switch is connected to the CCU and hence, the HEU, in the conventional manner, e.g. the same manner as other electrical devices on a car for indicating conditions at the car, such as the piston and cylinder air pressure indicator, so that an indicator at the HEU, e.g. a light source, or other electronic indicator, will indicate the condition of the brake shoes on the car.

In the preferred embodiment, the electrical switch is a normally open switch so that in the event of a failure of the brake shoes to assume their brake release positions, a failure of the switch or a failure of the medium, e.g. wires which interconnects the switch with the CCU, the indicator at the HEU will not indicate that the brake shoes are in their released positions.

Preferably, the slack adjuster interconnects a pair of the brake shoe beams, each of which caries a pair of brake shoes with each shoe being engageable with different car wheels so that if any one of the brake shoes has not fully released, the electrical switch will not be operated.

DETAILED DESCRIPTION OF PREFERRED EMBODIMENTS

The invention will be described in connection with a brake slack adjuster of the type described in detail in U.S. Pat. No. 3,850,269, the disclosure of which is incorporated herein by reference, and connected to the brake rigging as illustrated in U.S. Pat. No. 4,312,428, the disclosure of which is incorporated herein by reference. However, it will be apparent to those skilled in the art that the principles and apparatus of the invention can be used with other types of slack adjusters and with other connections of a slack adjuster the brake rigging.

Figure 1:
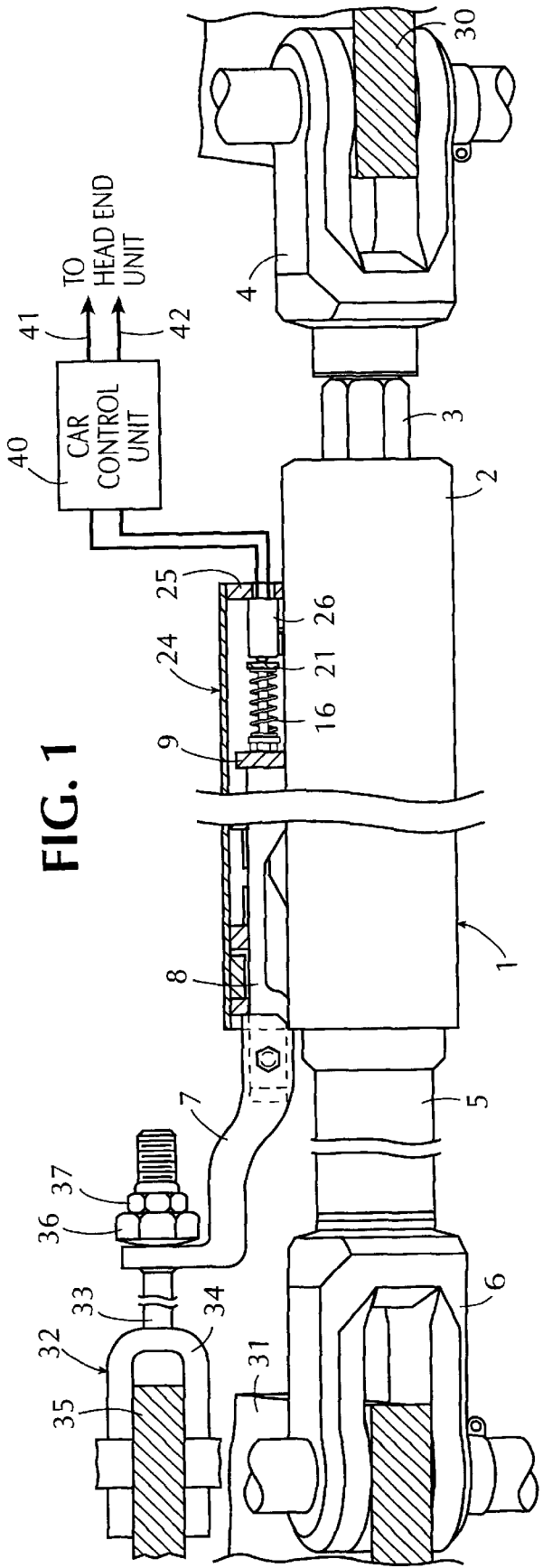
FIG. 1 is a fragmentary, partly schematic elevation view of a brake slack adjuster in combination with the apparatus of the invention.

In FIG. 1, the slack adjuster 1 has a housing 2 which receives the mechanisms for adjusting the length of the slack adjuster 1, such as the mechanisms disclosed in said Pat. No. 3,850,269. A non-circular rod 3 extends from one end of the housing 2 and is connected to the jaw 4. A tube 5 extends from the opposite end of the housing 2 and is connected to a jaw 6.

Figure 2:
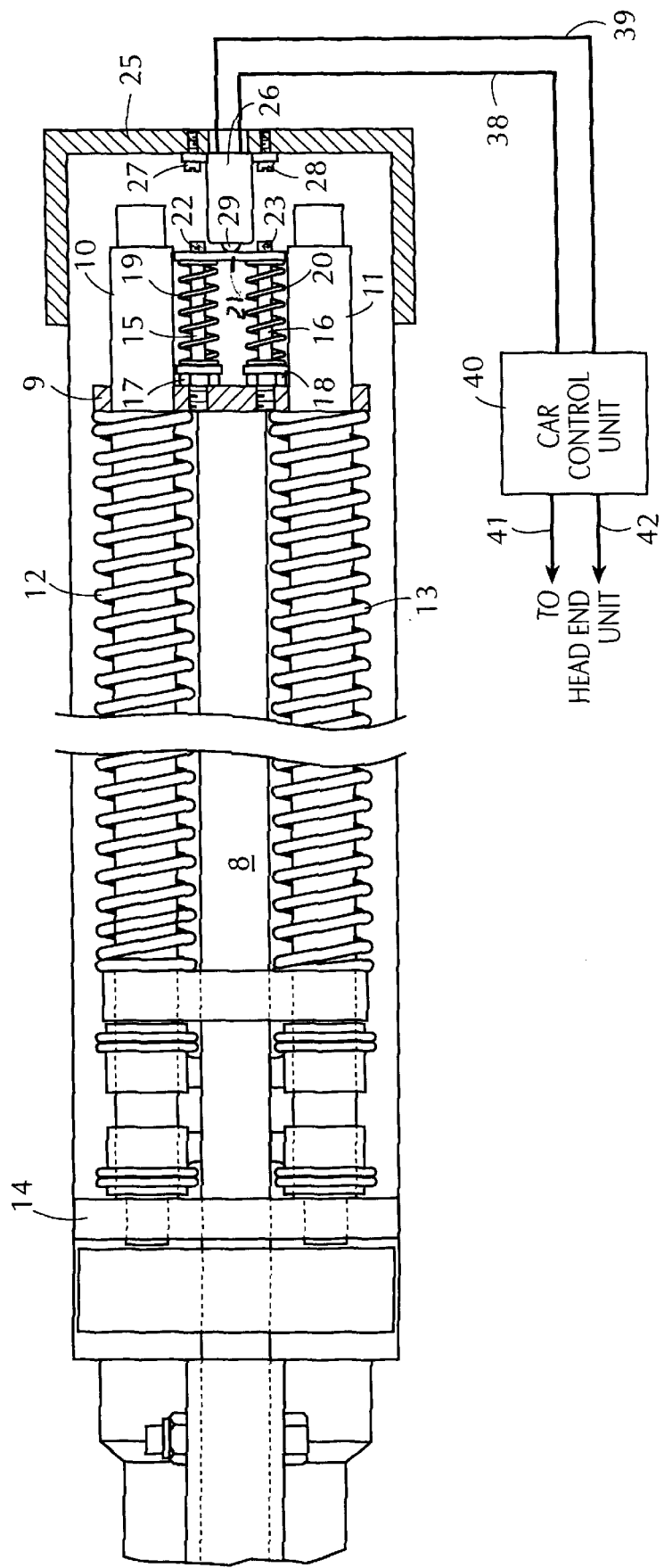
FIG. 2 is an enlarged, partly schematic, plan view of a portion of the apparatus shown in FIG. 1.

A trigger or actuator 7 is mounted on the housing 2 and is movable in the lengthwise direction of the housing 2. The trigger 7 is pivotably coupled to one end of a camming bar 8 which also is movable in the lengthwise direction of the housing 2. The opposite end of the camming bar 8 is secured to a rod guide 9 (FIG. 2) which slidably engages the guide rods 10 and 11.

The guide rods 10 and 11 are encircled by compression springs 12 and 13, respectively, and the rods 10 and 11 are secured at end to a member 14 in fixed relation to the housing 2. Thus, when the trigger 7 moves to the left, as viewed in FIG. 1, the bar 8 moves to the left causing the guide 9 to slide along the rods 10 and 11 and to the left and compressing the springs 12 and 13.

A pair of headless bolts 15 and 16 are threaded into the rod guide 9 and locked by nuts 17 and 18. The bolts 15 and 16 are encircled by compression springs 19 and 20. A plate 21 is slidably mounted on the bolts 15 and 16 and is held thereon by pins 22 and 23. A cover 24 having an end wall 25 has a switch 26 mounted thereon in any conventional manner, e.g. by screws 27 and 28. The switch 26 can be a normally open, single pole electrical switch having an operating member, such as a depressible actuating button 29.

Although the bolts 15 and 16, springs 19 and 20, plate 21, etc., can be omitted with the switch button directly engaging the rod guide 9 provided that the button has sufficient travel when depressed, the bolts 15 and 16, springs 19 and 20, plate 21, etc., act as overtravel means and are preferred to avoid damage to the switch 26 in the event of overtravel of the bar 8, and hence, the rod guide 9. Thus, the overtravel means permits the trigger 7 to move a greater distance than the button 29 without damage to the switch 26.

In a typical installation of a slack adjuster such as the slack adjuster 1, e.g. the installation illustrated in U.S. Pat. No. 4,312,428, the jaw 4 is pivotally connected to a lever 30 which transmits braking force from a brake air cylinder to a brake beam (not shown) which carries brake shoes which are engageable with wheels of a railway car truck. Similarly, the jaw 6 is pivotally connected to a lever 31 which transmits braking force to a brake beam which caries other brake shoes which are engageable with other wheels of the truck.

The trigger 7 is coupled to a control arm 32 comprising a threaded rod 33 secured to a yoke 34 which is pivotally connected to an actuating lever 35. A threaded adjusting nut 36 on the rod 32 engages the trigger 7 and is locked by a lock nut 37.

The operation of the braking apparatus and the slack adjuster 1 is described in detail in said Pat. Nos. 3,850,269 and 4,312,428, both of which are incorporated herein by reference, and need not be repeated herein. However, it will be observed that the position of the actuating lever 35, and hence, the trigger 7, is dependent upon the positions of the brake beams carrying the brake shoes. Therefore, if, for some reason, brake shoes do not disengage from the truck wheels when the brake cylinder air pressure is released, the trigger 7 and the camming bar 8 will not return to the positions shown in FIG. 2 in which the plate 21 engages the switch button 29 and closes the switch 26.

If the brake shoes disengage properly from the truck wheels when the brake cylinder air pressure is released, the springs 12 and 13 return the camming bar 8 and the plate 21 to positions in which the button 29 is depressed and the switch 26 is closed. Closure of the switch 26, which is connected by wires 38 and 39 to the known car control unit (CCU) 40 causes the CCU to transmit a signal to the head end unit in a known manner, such as by way of wires 41 and 42, which provides an indication that the brake shoes of the truck on which the slack adjuster 1 is mounted have disengaged from the respective wheels. For example, the signal from the CCU can control the operation of a light, a visual image on a cathode ray tube, a light emitting diode display, a liquid crystal display or a recorder. The signal can also include truck identifying data so that the location of the brake problem is identified.

In one of its simplest embodiments, a light would remain on in the locomotive cab until signals have been received from the CCU's of all cars that the truck brake shoes have become disengaged from their respective wheels.

Although a normally open switch 26 is preferred for the reasons set forth hereinbefore, a normally closed switch 26 can be used in connection with the CCU to provide information relating to the status of brake shoes on a truck of a railway car.

Also, it will be apparent to those skilled in the art from the foregoing description of the invention that other types of slack adjusters can be used and that the slack adjuster described on other types of slack adjusters can be differently installed in the brake rigging. However, it is desirable that the switch which controls the CCU be located so that it provides a direct indication of the disengagement of the brake shoes from the wheels, as in the embodiment described, rather than an indirect indication of the status of the brake shoes, as in the prior art.

In the preferred embodiment of the invention, the switch 26 is coupled to the trigger or actuator 7 as described, but it will be apparent to those skilled in the art that the switch may be coupled to the actuator 7 by any part which moves with the actuator 7.

Also, operation of the switch 26 by coupling it to the actuator 7 has the advantage that one switch can be employed to indicate the status of a plurality of brake shoes and the advantage that the relative positions of the actuator 7 and the switch 26 is a measure of the separation of the brake shoes from the wheels whereas location of the switch 26 elsewhere can provide a false indication of the brake shoe status.

Although preferred embodiments of the present invention have been described and illustrated, it will be apparent to those skilled in the art that various modifications may be made without departing from the principles of the invention.

What is claimed is:

1. In a vehicle braking system for a vehicle having wheels and having brake shoes engageable with said wheels in which the brake shoes are interconnected with means for applying forces to the brake shoes by brake rigging comprising a slack adjuster with an actuator, said slack adjuster and the position of said actuator being responsive to the position of said brake shoes, the improvement comprising an electrical switch coupled to said actuator and operable in accordance with the position of said actuator.

2. Braking system as set forth in claim 1 further comprising an indicator coupled to said switch for indicating the position of said brake shoes.

3. Braking system as set forth in claim 2 further comprising a car control unit coupled to said switch for providing an electrical signal responsive to said switch and wherein said indicator is coupled to said car control unit and responsive to said signal.

4. Braking system as set forth in claim 3 wherein said switch is a normally open switch which is closed when said actuator has a position corresponding to disengagement of at least one of said brake shoes from a wheel.

5. Braking system as set forth in claim 2 wherein said switch has an operating member which is movable a predetermined distance and which is coupled to said actuator by overtravel means engageable with said operating member, and permitting said actuator to move a distance greater than said predetermined distance without damage to said switch.

6. Braking system as set forth in claim 5 wherein said overtravel means comprises spring means acting between said actuator and said operating member.

* * * * *